(12) United States Patent
Driesen (10) Patent No.: US 11,551,141 B2
(45) Date of Patent: Jan. 10, 2023

(54) DATA ACCESS CONTROL AND WORKLOAD MANAGEMENT FRAMEWORK FOR DEVELOPMENT OF MACHINE LEARNING (ML) MODELS

(71) Applicant: SAP SE, Walldorf (DE)

(72) Inventor: Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 493 days.

(21) Appl. No.: 16/600,634

(22) Filed: Oct. 14, 2019

(65) Prior Publication Data

US 2021/0110296 A1 Apr. 15, 2021

(51) Int. Cl.
 *G06N 20/00* (2019.01)
 *H04L 9/40* (2022.01)
 *G06Q 30/00* (2012.01)

(52) U.S. Cl.
 CPC ............ *G06N 20/00* (2019.01); *G06Q 30/01* (2013.01); *H04L 63/0209* (2013.01); *H04L 63/20* (2013.01)

(58) Field of Classification Search
 CPC ...... G06N 20/00; H04L 63/0209; H04L 63/20
 See application file for complete search history.

(56) References Cited

U.S. PATENT DOCUMENTS

| | | | |
|---|---|---|---|
| 7,523,142 B2 | 4/2009 | Driesen et al. | |
| 8,200,634 B2 | 6/2012 | Driesen et al. | |
| 8,250,135 B2 | 8/2012 | Driesen et al. | |
| 8,291,038 B2 | 10/2012 | Driesen | |
| 8,301,610 B2 | 10/2012 | Driesen et al. | |
| 8,356,010 B2 | 1/2013 | Driesen | |
| 8,380,667 B2 | 2/2013 | Driesen | |
| 8,392,573 B2 | 3/2013 | Lehr et al. | |
| 8,402,086 B2 | 3/2013 | Driesen et al. | |
| 8,434,060 B2 | 4/2013 | Driesen et al. | |
| 8,479,187 B2 | 7/2013 | Driesen et al. | |
| 8,560,876 B2 | 10/2013 | Driesen et al. | |
| 8,566,784 B2 | 10/2013 | Driesen et al. | |
| 8,631,406 B2 | 1/2014 | Driesen et al. | |
| 8,762,929 B2 | 6/2014 | Driesen | |

(Continued)

OTHER PUBLICATIONS

U.S. Appl. No. 15/970,499, Eberlein et al, filed May 3, 2018.

(Continued)

*Primary Examiner* — Nicholas R Taylor
*Assistant Examiner* — Sanjoy K Roy
(74) *Attorney, Agent, or Firm* — Fish & Richardson P.C.

(57) ABSTRACT

Methods, systems, and computer-readable storage media for providing a software system to each customer in a set of customers, each customer being associated with a customer system in a set of customer systems, the software system including a set of views in a data science pool, each of the views in the set of views providing a data set based on production data of respective customers; for each customer system: accessing at least one data set within the customer system through a released view provided in a DMZ within the customer system and corresponding to a respective view in the set of views, and triggering training of a ML model in the DMZ to provide and results; and selectively publishing the ML model for consumption by each of the customers in the set of customers based on a set of results comprising the results from each customer system.

20 Claims, 7 Drawing Sheets

(56) References Cited

U.S. PATENT DOCUMENTS

| | | | |
|---|---|---|---|
| 8,793,230 B2 | 7/2014 | Engelko et al. | |
| 8,805,986 B2 | 8/2014 | Driesen et al. | |
| 8,875,122 B2 | 10/2014 | Driesen et al. | |
| 8,880,486 B2 | 11/2014 | Driesen et al. | |
| 8,924,384 B2 | 12/2014 | Driesen et al. | |
| 8,924,565 B2 | 12/2014 | Lehr et al. | |
| 8,972,934 B2 | 3/2015 | Driesen et al. | |
| 8,996,466 B2 | 3/2015 | Driesen | |
| 9,003,356 B2 | 4/2015 | Driesen et al. | |
| 9,026,502 B2 | 5/2015 | Driesen et al. | |
| 9,031,910 B2 | 5/2015 | Driesen | |
| 9,137,130 B2 | 9/2015 | Driesen et al. | |
| 9,189,226 B2 | 11/2015 | Driesen et al. | |
| 9,223,985 B2 | 12/2015 | Eberlein et al. | |
| 9,229,707 B2 | 1/2016 | Borissov et al. | |
| 9,354,860 B2 | 5/2016 | Eberlein et al. | |
| 9,354,871 B2 | 5/2016 | Eberlein et al. | |
| 9,361,093 B2 | 6/2016 | Meissner et al. | |
| 9,361,326 B2 | 6/2016 | Driesen et al. | |
| 9,372,685 B1 | 6/2016 | Luettge et al. | |
| 9,436,724 B2 | 9/2016 | Driesen et al. | |
| 9,471,659 B2 | 10/2016 | Driesen et al. | |
| 9,501,516 B2 | 11/2016 | Driesen | |
| 9,519,675 B2 | 12/2016 | Specht et al. | |
| 9,639,448 B2 | 5/2017 | Gebhard et al. | |
| 9,678,740 B2 | 6/2017 | Heine et al. | |
| 9,703,554 B2 | 7/2017 | Eberlein et al. | |
| 9,720,994 B2 | 8/2017 | Driesen et al. | |
| 9,721,116 B2 | 8/2017 | Driesen et al. | |
| 9,740,476 B2 | 8/2017 | Eberlein et al. | |
| 9,767,424 B2 | 9/2017 | Biewald et al. | |
| 9,836,299 B2 | 12/2017 | Eberlein et al. | |
| 9,858,309 B2 | 1/2018 | Eberlein et al. | |
| 9,898,279 B2 | 2/2018 | Eberlein et al. | |
| 9,898,494 B2 | 2/2018 | Eberlein et al. | |
| 9,898,495 B2 | 2/2018 | Eberlein et al. | |
| 9,927,992 B2 | 3/2018 | Driesen et al. | |
| 10,013,337 B2 | 7/2018 | Eberlein et al. | |
| 10,025,568 B2 | 7/2018 | Mayer et al. | |
| 10,055,215 B2 | 8/2018 | Specht et al. | |
| 10,120,886 B2 | 11/2018 | Eberlein et al. | |
| 10,157,052 B2 | 12/2018 | Eberlein et al. | |
| 10,157,068 B2 | 12/2018 | Arians et al. | |
| 10,185,552 B2 | 1/2019 | Eberlein et al. | |
| 10,191,733 B2 | 1/2019 | Driesen | |
| 10,268,472 B2 | 4/2019 | Eberlein et al. | |
| 10,268,692 B2 | 4/2019 | Mayer et al. | |
| 10,296,324 B2 | 5/2019 | Burkhardt et al. | |
| 10,303,665 B2 | 5/2019 | Engelko et al. | |
| 10,311,077 B2 | 6/2019 | Specht et al. | |
| 10,437,795 B2 | 10/2019 | Eberlein et al. | |
| 10,452,646 B2 | 10/2019 | Schlarb et al. | |
| 2012/0159435 A1 | 6/2012 | Driesen et al. | |
| 2013/0085810 A1 | 4/2013 | Driesen et al. | |
| 2014/0019429 A1 | 1/2014 | Driesen et al. | |
| 2016/0063050 A1 | 3/2016 | Schoen et al. | |
| 2016/0098253 A1 | 4/2016 | Hutzel et al. | |
| 2017/0103226 A1 | 4/2017 | Eberlein et al. | |
| 2017/0116296 A1 | 4/2017 | Specht et al. | |
| 2017/0161291 A1 | 6/2017 | Specht et al. | |
| 2017/0161511 A1 | 6/2017 | Eberlein et al. | |
| 2017/0286467 A1 | 10/2017 | Eberlein et al. | |
| 2017/0329505 A1 | 11/2017 | Richter et al. | |
| 2017/0344362 A1 | 11/2017 | Burkhardt et al. | |
| 2017/0351442 A1 | 12/2017 | Specht et al. | |
| 2018/0018590 A1* | 1/2018 | Szeto | G06N 20/10 |
| 2018/0095953 A1 | 4/2018 | Mayer et al. | |
| 2018/0129676 A1 | 5/2018 | Eberlein et al. | |
| 2018/0137010 A1 | 5/2018 | Mayer et al. | |
| 2018/0137145 A1 | 5/2018 | Mayer et al. | |
| 2018/0137146 A1 | 5/2018 | Mayer et al. | |
| 2018/0268154 A1 | 9/2018 | Specht et al. | |
| 2018/0285097 A1 | 10/2018 | Radermacher et al. | |
| 2018/0285390 A1 | 10/2018 | Mayer et al. | |
| 2018/0322462 A1* | 11/2018 | Jayaraman | G06N 20/00 |
| 2018/0329930 A1 | 11/2018 | Eberlein et al. | |
| 2018/0331927 A1 | 11/2018 | Eberlein et al. | |
| 2018/0336365 A1 | 11/2018 | Eberlein et al. | |
| 2018/0373767 A1 | 12/2018 | Specht et al. | |
| 2019/0018874 A1 | 1/2019 | Eberlein et al. | |
| 2019/0042988 A1* | 2/2019 | Brown | G06N 5/022 |
| 2019/0129985 A1 | 5/2019 | Schlarb et al. | |
| 2019/0129986 A1 | 5/2019 | Birn et al. | |
| 2019/0129988 A1 | 5/2019 | Auer et al. | |
| 2019/0129990 A1 | 5/2019 | Schlarb et al. | |
| 2019/0129991 A1 | 5/2019 | Auer et al. | |
| 2019/0129997 A1 | 5/2019 | Auer et al. | |
| 2019/0130010 A1 | 5/2019 | Auer et al. | |
| 2019/0130121 A1 | 5/2019 | Birn et al. | |
| 2019/0220289 A1 | 7/2019 | Driesen et al. | |
| 2019/0244138 A1* | 8/2019 | Bhowmick | H04L 67/10 |
| 2020/0050968 A1* | 2/2020 | Lee | G06N 20/00 |
| 2020/0242466 A1* | 7/2020 | Mohassel | G06F 21/6245 |

OTHER PUBLICATIONS

U.S. Appl. No. 15/983,469, Driesen et al., filed May 18, 2018.
U.S. Appl. No. 15/983,812, Eberlein et al, filed May 18, 2018.
U.S. Appl. No. 15/996,804, Hauck et al., filed Jun. 4, 2018.
U.S. Appl. No. 16/005,927, Kruempelmann et al., filed Jun. 12, 2018.
U.S. Appl. No. 16/173,225, Eberlein et al, filed Oct. 29, 2018.
U.S. Appl. No. 16/197,888, Meissner et al., filed Nov. 21, 2018.
U.S. Appl. No. 16/208,920, Eberlein et al, filed Dec. 4, 2018.
U.S. Appl. No. 16/214,724, Eberlein et al, filed Dec. 10, 2018.
U.S. Appl. No. 16/219,358, Eberlein et al, filed Feb. 13, 2018.
U.S. Appl. No. 16/219,371, Eberlein et al, filed Dec. 13, 2018.
U.S. Appl. No. 16/410,076, Eberlein et al, filed May 13, 2019.
U.S. Appl. No. 16/455,072, Eberlein et al, filed Jun. 27, 2019.
U.S. Appl. No. 16/521,642, Eberlein et al, filed Jul. 25, 2019.
U.S. Appl. No. 16/580,318, Eberlein et al, filed Sep. 24, 2019.
Sarkar, "Continuous Numeric Data" Towards Data Science, created on Jan. 4, 2018, [Retrieved on Oct. 14, 2019], retrieved from : URL <https://towardsdatascience.com/understanding-feature-engineering-part-1-continuous-numeric-data-da4e47099a7b>, 28 pages.
Sarkar, "Categorical Data" Towards Data Science, created on Jan. 6, 2018,[Retrieved on Oct. 14, 2019], retrieved from : URL <https://towardsdatascience.com/understanding-feature-engineering-part-2-categorical-data-f54324193e63>, 20 pages.

* cited by examiner

DATA ACCESS CONTROL AND WORKLOAD MANAGEMENT FRAMEWORK FOR DEVELOPMENT OF MACHINE LEARNING (ML) MODELS

BACKGROUND

Software vendors develop software systems that are used by customers, such as commercial enterprises. More frequently, software systems provide functionality based on artificial intelligence (AI). For example, software systems can include one or more machine-learning (ML) models that are used to support functionality of the software system. However, while the software system may be provided to multiple, different customers, the ML models should be specific to each customer and their operations. For example, although a software system can be shipped with a ML model that seeks to be customer agnostic, the software system can be customized by respective customers or for respective industries (e.g., data sets that are master data for one customer are transactional data for another customer, data value distribution and data volume may also vary greatly between customers).

In developing the ML models, the software vendor typically does not have production data (e.g., data generated and/or modified during production use of a software system). While an ML model can be designed for a particular software system, the ML model can be customized for respective scenarios by training the ML model using production data. However, customers are hesitant to make production data available to software vendors. For example, production data can include business-critical data, privacy-related data, and for some data sets, there may be legal constraints on who is allowed to see and/or use the data. In view of this, software vendors often need to rely on synthetic data (e.g., data created to represent production data), anonymized data, and/or obfuscated data, collectively referred to herein as non-production data. Such non-production data, however, does not accurately capture patterns and other characteristics of the production data. Consequently, ML models that are designed and trained based on such non-production data often do not achieve desired performance when in production use.

SUMMARY

Implementations of the present disclosure are directed to a data access control and workload management framework for development of machine learning (ML) models. More particularly, implementations of the present disclosure are directed to developing a ML model provided by a software vendor by training the ML model within a demilitarized zone (DMZ) of each of a plurality of customers using transformed data based on production data of each of the plurality of customers.

In some implementations, actions include providing, by the software vendor, a software system to each customer in a set of customers, each customer being associated with a customer system in a set of customer systems, the software system including a set of views in a data science pool, each of the views in the set of views providing a data set based on production data of respective customers; for each customer system: accessing, by the software vendor, at least one data set within the customer system through a released view, the released view being provided in a DMZ within the customer system and corresponding to a respective view in the set of views, and triggering, by the software vendor, training of a ML model in the DMZ within the customer system to provide a trained ML model and results; and selectively publishing the ML model for consumption by each of the customers in the set of customers based on a set of results comprising the results from each customer system. Other implementations of this aspect include corresponding systems, apparatus, and computer programs, configured to perform the actions of the methods, encoded on computer storage devices.

These and other implementations can each optionally include one or more of the following features: in response to triggering of training of the ML model, training of the ML model is performed based on a workload schedule defined by a respective customer; the released view is released to the DMZ from the set of views by a respective customer; each view in the set of views applies one or more transformations to the production data of the respective customer; the one or more transformations include one or more of transforming text data to numerical data, and modifying numerical data based on one or more random numbers; selectively publishing the ML model for consumption includes determining that the ML model is satisfactory based on the set of results, and in response, publishing the ML model; and the set of results includes accuracies of the ML model, each accuracy corresponding to a respective customer in the set of customer.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a data access control and workload management framework for development of machine learning (ML) models. More particularly, implementations of the present disclosure are directed to developing a ML model provided by a software vendor by training the ML model within a demilitarized zone (DMZ) of each of a plurality of customers using transformed data based on production data of each of the plurality of customers. Implementations can include actions of providing, by the software vendor, a software system to each customer in a set of customers, each customer being associated with a customer system in a set of customer systems, the software system including a set of views in a data science pool, each of the views in the set of views providing a data set based on production data of respective customers; for each customer system: accessing, by the software vendor, at least one data set within the customer system through a released view, the released view being provided in a DMZ within the customer system and corresponding to a respective view in the set of views, and triggering, by the software vendor, training of a ML model in the DMZ within the customer system to provide a trained ML model and results; and selectively publishing the ML model for consumption by each of the customers in the set of customers based on a set of results comprising the results from each customer system.

To provide further context for implementations of the present disclosure, and as introduced above, software vendors develop software systems that are used by customers, such as commercial enterprises. More frequently, software systems provide functionality based on artificial intelligence (AI). For example, software systems can include one or more machine-learning (ML) models that are used to support functionality of the software system. However, while the software system may be provided to multiple, different customers, the ML models should be specific to each customer and their operations. For example, a software system can be shipped with a foundational data structure (e.g., all tables and data models are the same across all customers) and with a ML model that is customer agnostic (i.e., that is trained in a generic manner, such as using non-production data). However, upon deployment, each customer can customize the software system. For example, a first customer can customize the software system using one or more post-deployment add-ons and/or private extensions to provide a first customized software system, and a second customer can customize the software system using one or more post-deployment add-ons and/or private extensions to provide a second customized software system.

In developing the ML models, the software vendor typically does not have production data (e.g., data generated and/or modified during production use of a software system). While an ML model can be designed for a particular software system, the ML model can be customized for respective scenarios by training the ML model using production data. For example, and continuing with the example above, a ML model for the first customized software system can be trained to be specific to the first customized software system, while a ML model for the second customized software system can be trained to be specific to the second customized software system. By way of non-limiting example, enterprise resource planning (ERP) systems are customized when deployed to respective customers. For example, customers in different industries have different needs that are addressed through customization (e.g., data sets that are master data for one customer are transactional data for another customer; data value distribution and data volume may also vary greatly between customers).

However, customers are hesitant to make production data available to software vendors to enable customer-specific training of ML models. For example, production data can include business-critical data, privacy-related data, and for some data sets, there may be legal constraints on who is allowed to see and/or use the data. In view of this, software vendors often need to rely on synthetic data (e.g., data created to represent production data), anonymized data, and/or obfuscated data, collectively referred to herein as non-production data, as noted above. Such non-production data, however, does not accurately capture patterns and other characteristics of the production data that is specific to each customer. Consequently, ML models that are designed and trained based on such non-production data often do not achieve desired performance when in production use for any particular customer.

In view of the above context, implementations of the present disclosure provide a data access control and workload management framework that enables software vendors selective access to production data for development of ML models. As described in further detail herein, the data access control and workload management framework includes extension of a software product (e.g., ERP system) to include a so-called DMZ that is used to manage data access to customer data for the software vendor. In some implementations, each customer can control access of the software vendor to its data. More particularly, each customer can expose data sets for analysis by the software vendor. The data sets are transformed data, and the software vendor is prohibited from direct database access. That is, the software vendor is unable to directly access data stored in respective databases of customers.

In some implementations, the software vendor executes data analysis on the exposed data sets and can design and training ML models based thereon. Implementations of the present disclosure can be used for developing and training any appropriate type of ML models. Example types of ML models include, without limitation, regression models, binary classification models, multi-classification models, neural networks, and autoencoders. Because the software vendor can have access to data sets of multiple customers, training and assessment of a ML model can be based on data sets of respective customers. In this manner, the software vendor is able to assess how well the ML models work for the individual customers. Once the software vendor is satisfied with the performance of a ML model, the ML model is published for consumption by the customers. In some examples, a customer can be informed as to whether the ML model had been developed based on their respective data set. In this manner, the customer can have a level of confidence that the ML model would provide satisfactory performance for their needs. In such cases, the ML model is selected by the customer and is trained on their production data (potentially non-transformed) and can be used in production.

Figure 1:
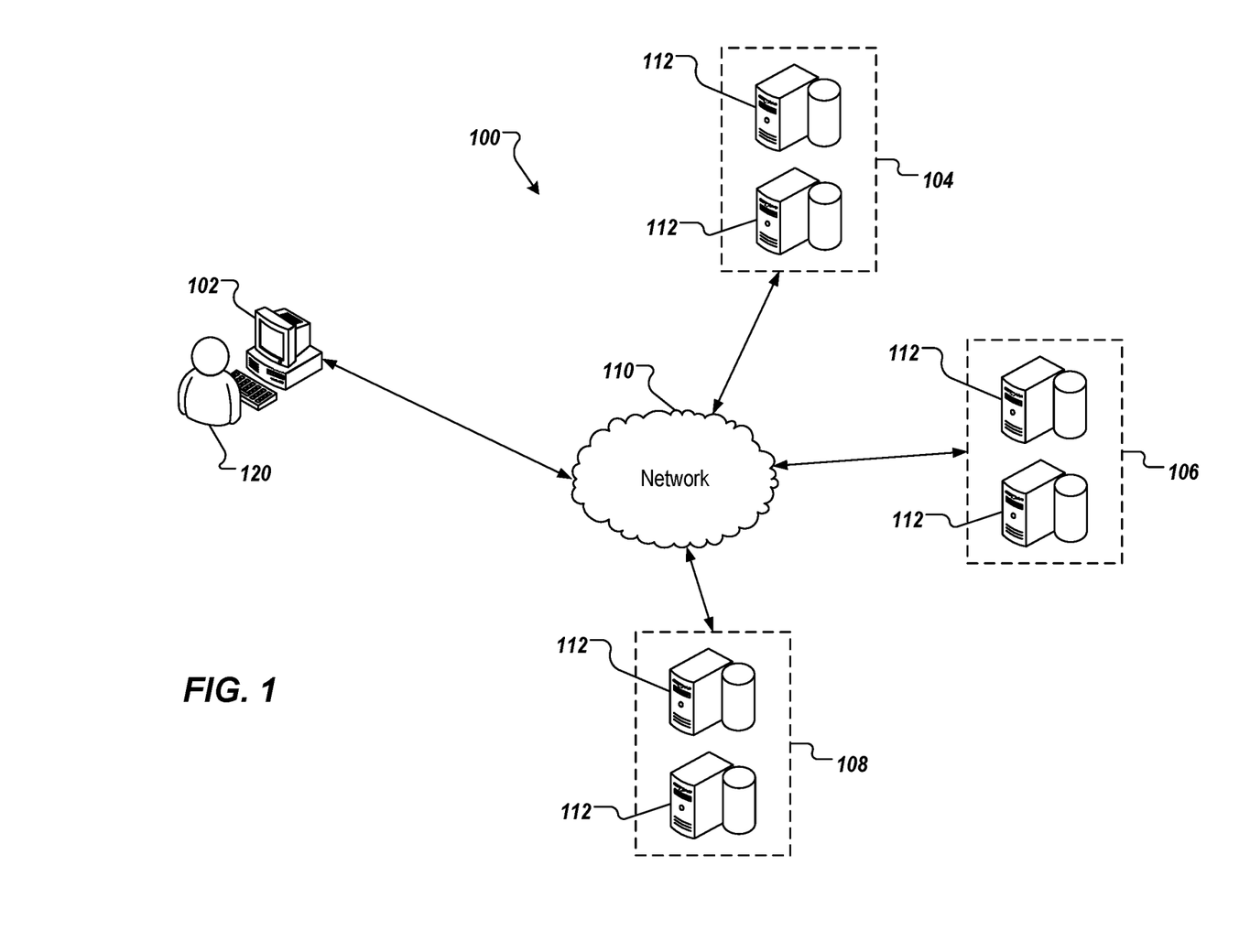
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, server systems 104, 106, 108, and a network 110. Each server system 104, 106, 108 includes one or more server devices and databases 112 (e.g., processors, memory). In the depicted example, a user 120 interacts with the client device 102.

In some examples, the client device 102 can communicate with the server systems 104, 106, 108 over the network 110. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server system 104, 106, 108 includes at least one server and at least one data store. In the example of FIG. 1, the server systems 104, 106, 108 is intended to represent various forms of servers including, but not limited to a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, a data access control and workload management framework can be executed within the architecture 100 to enable software vendors selective access to production data for development of ML models. For example, the server system 104 can be associated with a software vendor that develops software systems (e.g., an ERP system) for customers. In some examples, the software vendor develops ML models for its software systems within the server system 104. In some examples, the server system 106 is associated with a first customer that consumes a software system provided by the software vendor. For example, the server system 106 hosts the software system for production use by the first customer and stores production data that is generated through production use of the software system. In some examples, the server system 108 is associated with a second customer that consumes the software system provided by the software vendor. For example, the server system 108 hosts the software system for production use by the second customer and stores production data that is generated through production use of the software system.

In some implementations, and as described in further detail herein, the data access control and workload management framework enables the software vendor to selectively access data sets of each of the first customer and the second customer, the data sets being based on production data of the first customer and the second customer, respectively. For example, the first customer and the second customer can each subscribe for participation in development and training of ML models using data sets that are based on their respective production data.

In some implementations, each customer releases data sets for analysis and training of an ML model. In some examples, to provide a data set, each customer defines one or more views on production data that is stored in one or more tables of a respective database of the customer. In some examples, a view can be described as a logical data sets that contains data extracted from one or more tables based on a query. In some implementations, the query underlying a view defines the data that is sought from the one or more tables and can define one or more transformations that are to be applied to the data (e.g., to anonymize the production data), as described in further detail herein. In this manner, a view provides a data set that includes production data that has been transformed.

In some implementations, the ML model is deployed to and trained within each customer system. That is, for each customer, the software vendor is provided limited access to a customer system (e.g., the server system 106 for the first customer, the server system 108 for the second customer) to deploy the ML model and train the ML model within the customer system. In some examples, each customer provides a workload schedule that defines one or more limitations on deployment and/or training of the ML model within the respective customer system. The ML model is trained on the data sets within each customer system and training statistics and results are provided to the software vendor from each customer. In some examples, multiple iterations of training can be performed. For example, if the training statistics and results indicate that the ML model is not satisfactory (e.g., performance of the ML model is below a threshold performance for a threshold number of customers), the ML model can be adjusted, and another iteration of training conducted.

If the ML model is determined to be satisfactory, the ML model is published for production use by the software vendor. That is, for example, the software vendor can notify customers, which participated in training of the ML model, that the ML model is available for production use. Customers can individually determine whether to deploy the ML model for production use in their respective customer systems. In some examples, only customers, for which the ML model provided satisfactory performance are notified. In some examples, all customers are notified, regardless of performance of the ML model for respective customers.

Figure 2A:
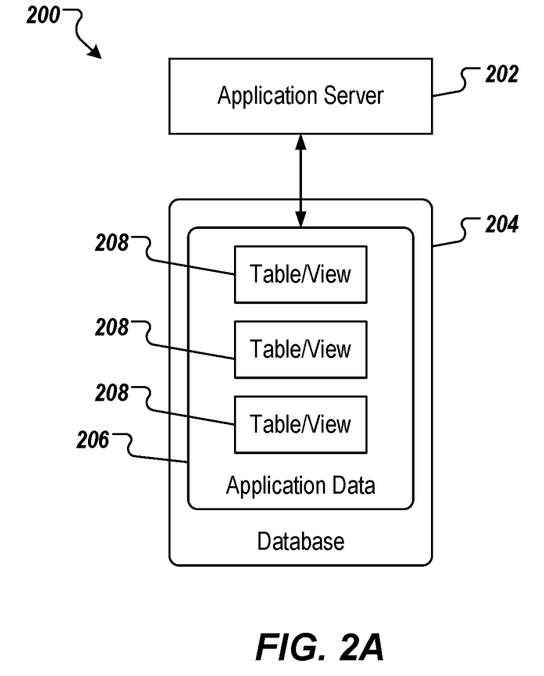
FIGS. 2A-2D depict an example conceptual architecture in accordance with implementations of the present disclosure.

FIGS. 2A-2D depicts an example conceptual architecture 200 in accordance with implementations of the present disclosure. More particularly, FIGS. 2A-2D depicts a progression of the example conceptual architecture 200 in implementing the data access control and workload management framework. In the example of FIG. 2A, the example conceptual architecture 200 is associated with a specific customer and includes an application server 202 and a database system 204. For example, the application server 202 and the database system 204 can be provided as an on-premise system operated by the customer. As another example, the application server 202 and the database system 204 can be provided as a cloud-based system operated by or on behalf of the customer.

In some implementations, the application server 204 executes a software system (e.g., ERP system) provided by the software vendor. In some examples, the software system is customized for the particular customer. For example, the software system can be customized based on add-ons and/or extensions that are applied to a base software system provided by the software vendor. In some implementations, execution of the software system generates production data that is stored in as application data 206 within the database system 204. For example, the production data can be stored in one or more tables and/or can be accessed by one or more views, collectively indicated as table/view 208, within the application data 206. That is, the table/views 208 are used by the customer during production use of the software system for storing and accessing production data.

As introduced above, the customer can subscribe to participate in development of ML models by the software vendor. To this end, and with reference to FIG. 2B, the customer can establish a data science pool 210 within the database system 204 and can manage production data provided to the data science pool 210 through a pool management system 212. In some examples, the data science pool 210 defines production data that can be used to provide data sets for development of ML models, as described in further detail herein.

Figure 2B:
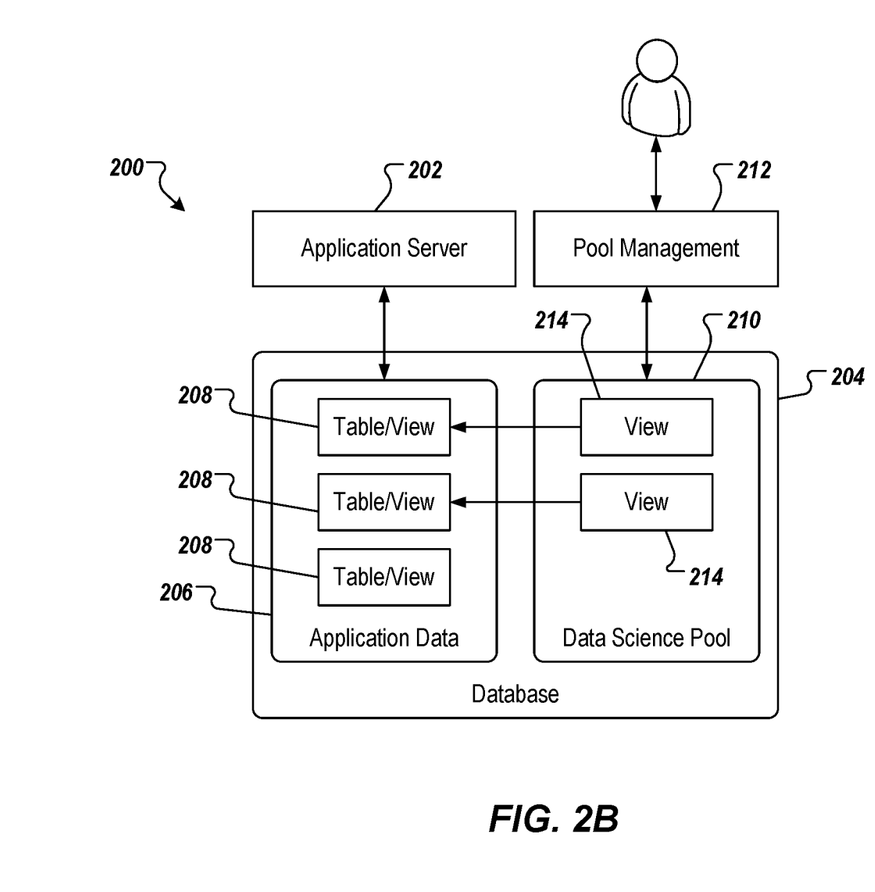

In further detail, the data science pool 210 includes one or more views 214 on production data within the application data 206. In some implementations, the one or more views 214 are defined by the software vendor. For example, the software vendor knows the software system, the data processed by the software system and the structure of the data, and creates the views 214, which can be exposed for a ML scenario development, as described herein. In some examples, the views can be defined at the software vendor and can be shipped as part of the software system. As described in further detail herein, the views can contain data transformation and can contain random numbers generated at the customer-side not known to the vendor. For example, an administrator 216 of the customer can trigger random number generation for each of the views 214, as appropriate. Further, the software vendor is not able to directly access the data science pool 210.

In accordance with implementations of the present disclosure, each of the view 214 selects particular production data to be used for training of an ML model and performs one or more transformations on the production data to provide a data set. In some examples, information is filtered from the production data. For example, personally identifiable information (PII) (e.g., names) is filtered from the production data and is absent from the data set. In some implementations, transformations of the views 214 include so-called feature-engineering transformations, which are applied to transform the production data to provide transformed data within the data set (e.g., anonymized data). For example, text data within a text field can be transformed into numerical data. By way of non-limiting example, ERP data typically contains data fields with string values, the string values of a defined set of values. String values (e.g., for a type of absence: "illness," "vacation," "time account retrieval," "wedding-vacation") can be understood as categorical data and can be mapped to integers (e.g., "illness"=1, "vacation"=2, "time account retrieval"=3, etc.). The map can be computed and stored in the schema 210 and the views 214 can join the mapping table with the data table and in the view 214 only show integers.

As another example, numerical data within numerical data fields can be multiplied by a random number (r) (e.g., between 0.1 ($r_{low}$) and 10 ($r_{high}$)). In some examples, the customer knows the random number, but the software vendor does not know the random number. For example, if a salary of an employee is in the production data, and has a value X (e.g., $18M), the transformed value in the resulting data set can be anything between $r_{low}$ times X and $r_{high}$ times X (e.g., $1.8M and $180M). The software vendor cannot derive from the data set and/or the resulting ML model, what the salaries are. Still, because the numbers are multiplied by a constant factor, the data science process is not harmed. Further, for model training, numbers will likely be scaled to fit sizing to the needs anyways.

Figure 2C:
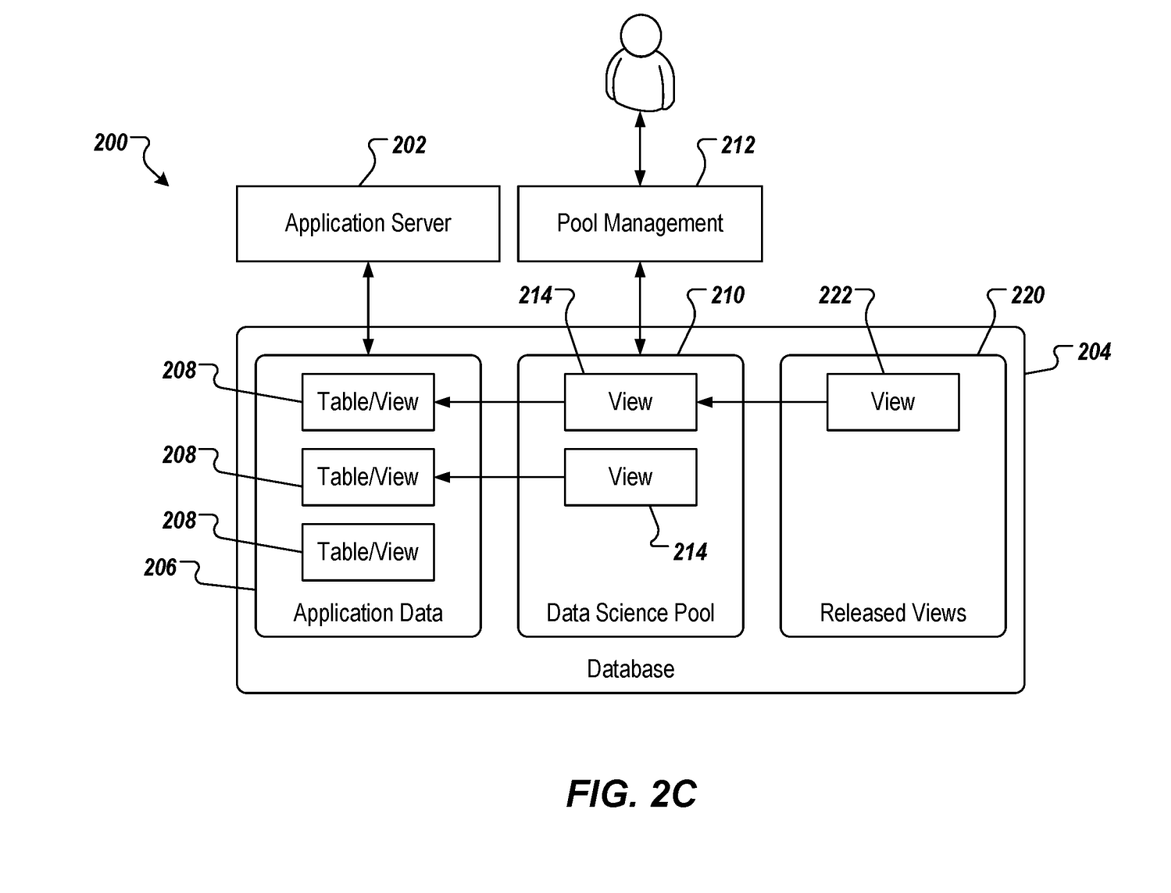

Referring now to FIG. 2C, the customer can release the one or more views 214 as released views 220. In the example of FIG. 2C a view 222 is provided as a released view. For example, the customer can decide, which of the views 214 is to be released. For example, a view 214 can be associated with human resources (HR) data that is not to be exposed and is not released to the released views 220. In accordance with implementations of the present disclosure, the released view 222 enables access to a data set (which includes transformed production data) from the data science pool 210. That is, while the software vendor is prohibited from accessing the data science pool 210, the software vendor is able to access data sets provided from the data science pool 210 through the released views 220. Accordingly, the released views 220 can be considered to be included in the DMZ introduced above. The access can be constrained to "read-only" access for DB users in schema 220, such that users cannot write to views in schema 210 or to tables in schema 206.

Figure 2D:
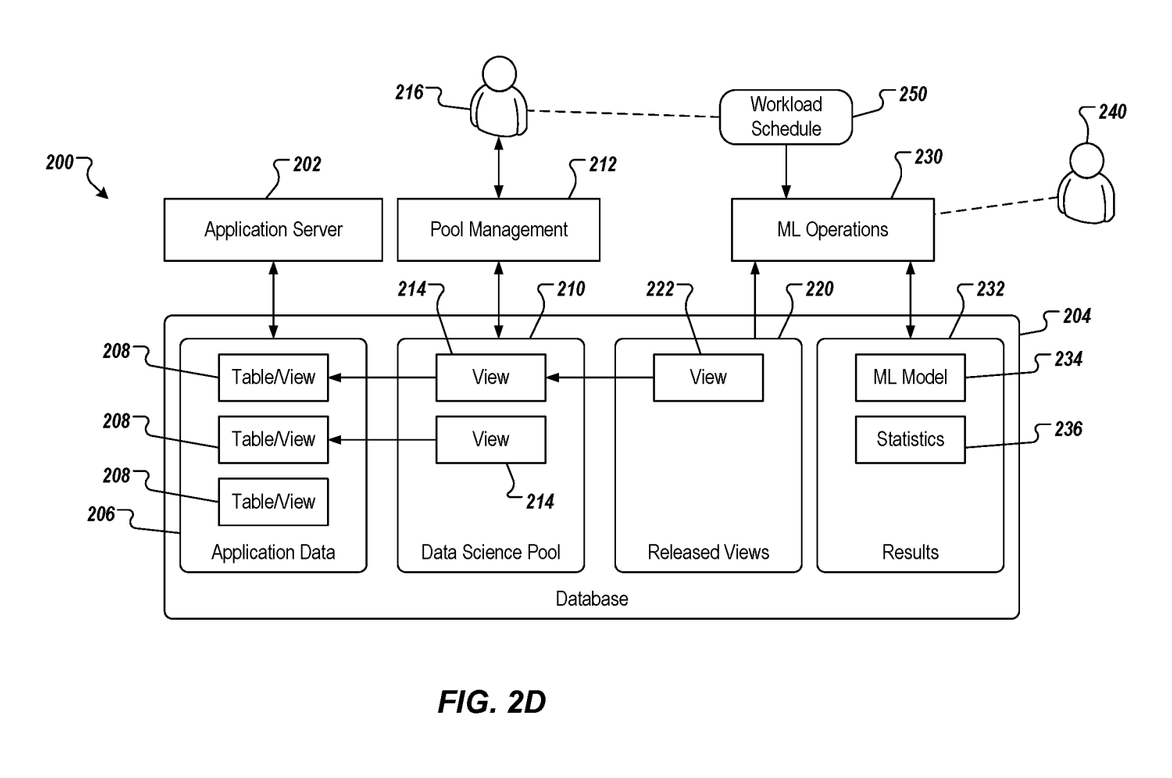

Referring now to FIG. 2D, the data sets provided through the released views 220 is used to develop and train the ML model. In some implementations, an ML operations system 230 is provided, which receives data sets through the released views 230, performs analysis and trains an ML model using the data sets, and provides results 232. Accordingly, the ML operations system 230 and the results 232 can be considered to be included in the DMZ introduced above. In the example of FIG. 2D, the results 232 include a trained ML model 234 and statistics 236. Example statistics can include, without limitation, a time required to train the ML model, and an accuracy of the ML model. In some examples, the software vendor is provided with uninhibited access to the results 232.

In further detail, a vendor-side user 240 (e.g., a data scientist) can trigger data analysis jobs (e.g. creating data histograms, statistical values, data visualization and other analysis jobs) on the data sets provided from the released views 220 using the ML operations system 230. In some examples, the vendor-side user 240 does this for multiple customers (e.g., each customer that is subscribed). In some examples, the vendor-side user 240 defines a ML model to run on data sets provided through the released views 220, and schedules training of the ML model. The training job is run and the job statistics (e.g., accuracy) and ML model are returned to the vendor-side user 240. The training job can include any appropriate type of ML training. Example types of ML training can include, without limitation, supervised learning and unsupervised learning.

In some implementations, the customer defines a workload schedule 250 that limits when ML activities can be performed within the customer system. For example, ML training consumes hardware resources (e.g., I/O, RAM, CPU), and there may be periods when the customer needs the hardware resources for other tasks. For example, peak times in the customer's operations (e.g., black Friday, campaign runs, fiscal year close) may require more resources. Consequently, the workload schedule 250 can define periods, within which ML activities can (or cannot) be performed. In some examples, the workload schedule 250 can define limits on resources (e.g., I/O, RAM, CPU) that can be used for ML activities. In some examples, the software vendor triggers a training job to initiate training of the ML model. In some examples, triggering can include transmitting a message to the customer system requesting that the training job be performed. In response to the software vendor triggering a training job, the training job can be scheduled to execute within the customer system based on the workload schedule 250. In this manner, the customer can ensure that the ML activities of the vendor do not impact business operations, if production hardware is used during the training.

In accordance with implementations of the present disclosure, the above-described process is performed for multiple customers. For example, the software vendor can develop a ML model based on data analysis jobs (e.g. creating data histograms, statistical values, data visualization and other analysis jobs) on the data sets provided from the released views across a set of customers. The ML model is trained within each customer system to provide a set of trained ML models, each trained ML model being specific to a customer, and a set of results, each result being specific to a customer. In some examples, the software vendor can evaluate the results to determine whether another iteration of training is to be performed. For example, the set of results can include an accuracy for a respective customer. If the accuracy is below a threshold accuracy for a threshold number of customers, the ML model can be adjusted and another iteration of training can be performed across the set of customers.

By way of non-limiting example, a set of customers can include five customers that use an ERP system provided by the software vendor. The software vendor develops a ML model that can be used in the ERP system and trains the ML model at each of the five customers. After an initial iteration of training, the following example results can be provided:

TABLE 1

Example Set of Results (Initial Iteration)

| Customer | Accuracy of ML Model |
|---|---|
| Customer 1 | 90% |
| Customer 2 | 87% |
| Customer 3 | 62% |
| Customer 4 | 96% |
| Customer 5 | 93% |

It can be determined that the accuracy is below a threshold accuracy for a threshold number of customers. For example, the threshold accuracy can be provided as 95% and the threshold number of customers can be four (4). In some examples, the threshold number of customers can be based on the number of customers provided in the set of customers (e.g., X % of customers included in the set of customers). In some examples, the set of customers include customers that have subscribed for participation in the ML training. In the example of Table 1, it can be determined that the accuracy for only one customer is above the threshold accuracy. Consequently, the software vendor can modify the ML model (e.g., add, delete, modify one or more parameters of the ML model) to provide a modified ML model and conduct another iteration of training.

After a subsequent iteration of training, the following example results can be provided:

TABLE 2

Example Set of Results (Subsequent Iteration)

| Customer | Accuracy of ML Model |
|---|---|
| Customer 1 | 96% |
| Customer 2 | 96% |
| Customer 3 | 83% |
| Customer 4 | 98% |
| Customer 5 | 96% |

From these example results, it can be determined that the accuracy is above the threshold accuracy for the threshold number of customers. Consequently, it can be determined that the ML model is satisfactory for publication and subsequent production use. In response, the software vendor can publish the ML model, notifying each of the customers of the availability of the ML model. In some examples, each customer is also provided with respective statistics (i.e., customer-specific statistics) for the ML model. For example, Customer 4 would be notified of the availability of the ML model and that the accuracy of the ML model is 98% for Customer 4.

In some implementations, a customer can decide to implement the ML model into production use with the underlying software system (e.g., ERP system). For example, Customer 4 can determine that the ML model is satisfactory and use the ML model in production. As a counter-example, Customer 3 can determine that the ML model is unsatisfactory and decide not to use the ML model in production.

In some implementations, the ML model and associated artifacts are made available to the customers for download. For example, to be used in a software system, the ML model needs to be downloaded and integrated into the software system and used in a target user interface (UI). In some examples, the artifacts can enable this. Example artifacts can include, without limitation, UI definitions, procedure calls to integrate the ML model into processes executed by the software system, and the like. Additionally, the ML model will likely be re-trained periodically (e.g., to adjust to changed data). Accordingly, artifacts can include a job schedule and a training program.

If a customer decides to integrate the ML model, the ML model and artifacts are downloaded to the customer system. In some implementations, the ML model is downloaded as an untrained ML model. In some implementations, the ML model is trained on the customer system using production data (e.g., non-transformed data). That is, for example, the ML model is trained through execution of a training program directly within the customer system and outside of the DMZ. In this manner, the ML model is trained by the customer using their respective customer data and is inaccessible to third-parties (e.g., the software vendor).

Figure 3:
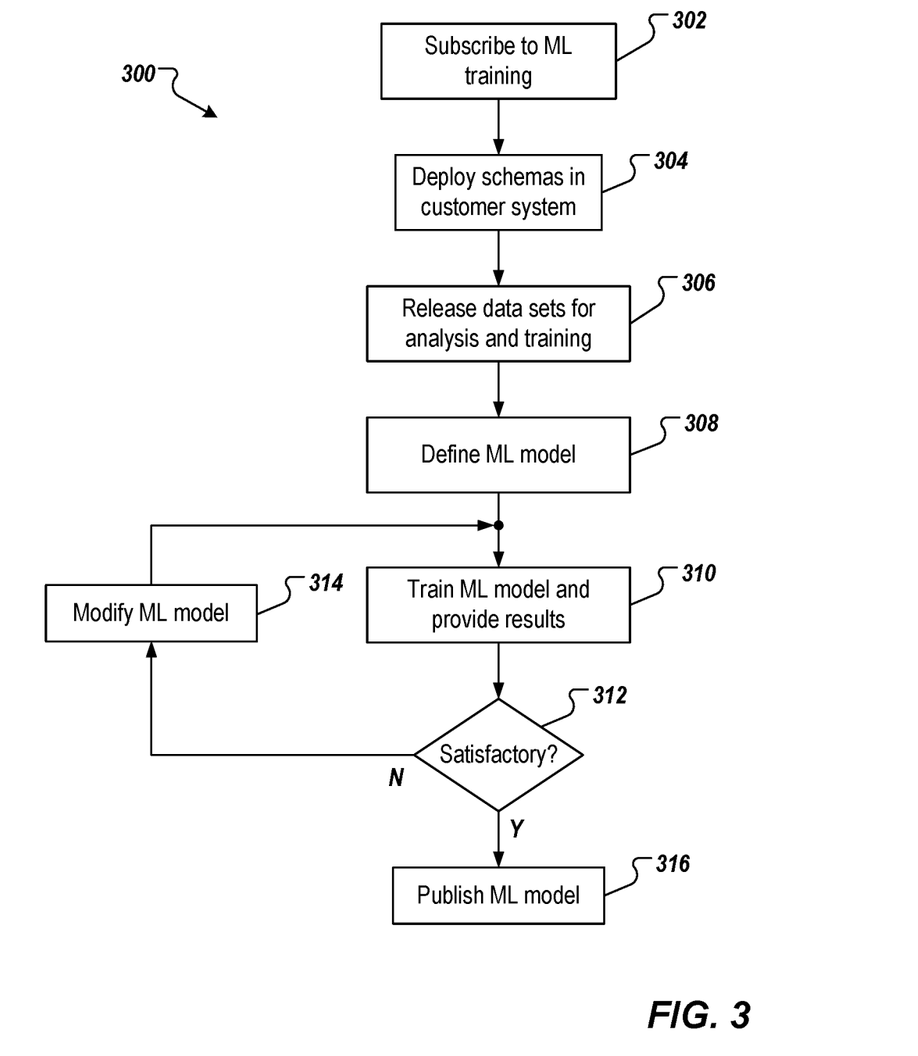
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A set of customers subscribe to ML training (302). For example, and as described herein, each customer in the set of customers uses a software system provided by a software vendor. Each customer can subscribe to participate in provisioning of ML models based on their respective production data and training of ML models within a respective customer system, as described herein. Schemas are deployed in customer systems (304). For example, and as described herein, the software system can be provided to a customer and can include a set of schemas for customer-side data transformation and training of ML models. Example schemas include, without limitation, the data science pool including one or more views that provide data sets including production data that has been transformed, and the released views that provide the software vendor access to the data sets. Data sets are released for analysis and training (306). For example, and as described herein, the customer selects one or more views of the data science pool that are to be released to the software vendor, each released view providing the software vendor access to a respective data set.

An ML model is defined (308). For example, and as described herein, the software vendor (e.g., a data scientist employed by the software vendor) defines a ML model based on statistics and any other appropriate information determined from the data sets. That is, the ML model can be defined based on information determined from the data sets across all customers that have subscribed. The ML model is trained and a set of results is provided (310). For example, the ML model is trained within a customer system of each of the customers and a result is provided for each training. Consequently, multiple trained ML models, a trained ML model for a respective customer, and multiple results are provided, a result for a respective customer. In some examples, each result includes an accuracy of a respective trained ML model for a respective customer.

It is determined whether the ML model is satisfactory (312). For example, and as described herein, whether the ML model is satisfactory can be determined based on whether the accuracy is below a threshold accuracy for a threshold number of customers. If the ML model is not satisfactory, the ML model is modified (314) and the example process 300 loops back. For example, one or more parameters of the ML model can be adjusted and another iteration of training and evaluation across the customers can be performed. If the ML model is satisfactory, the ML model is published (316).

Figure 4:
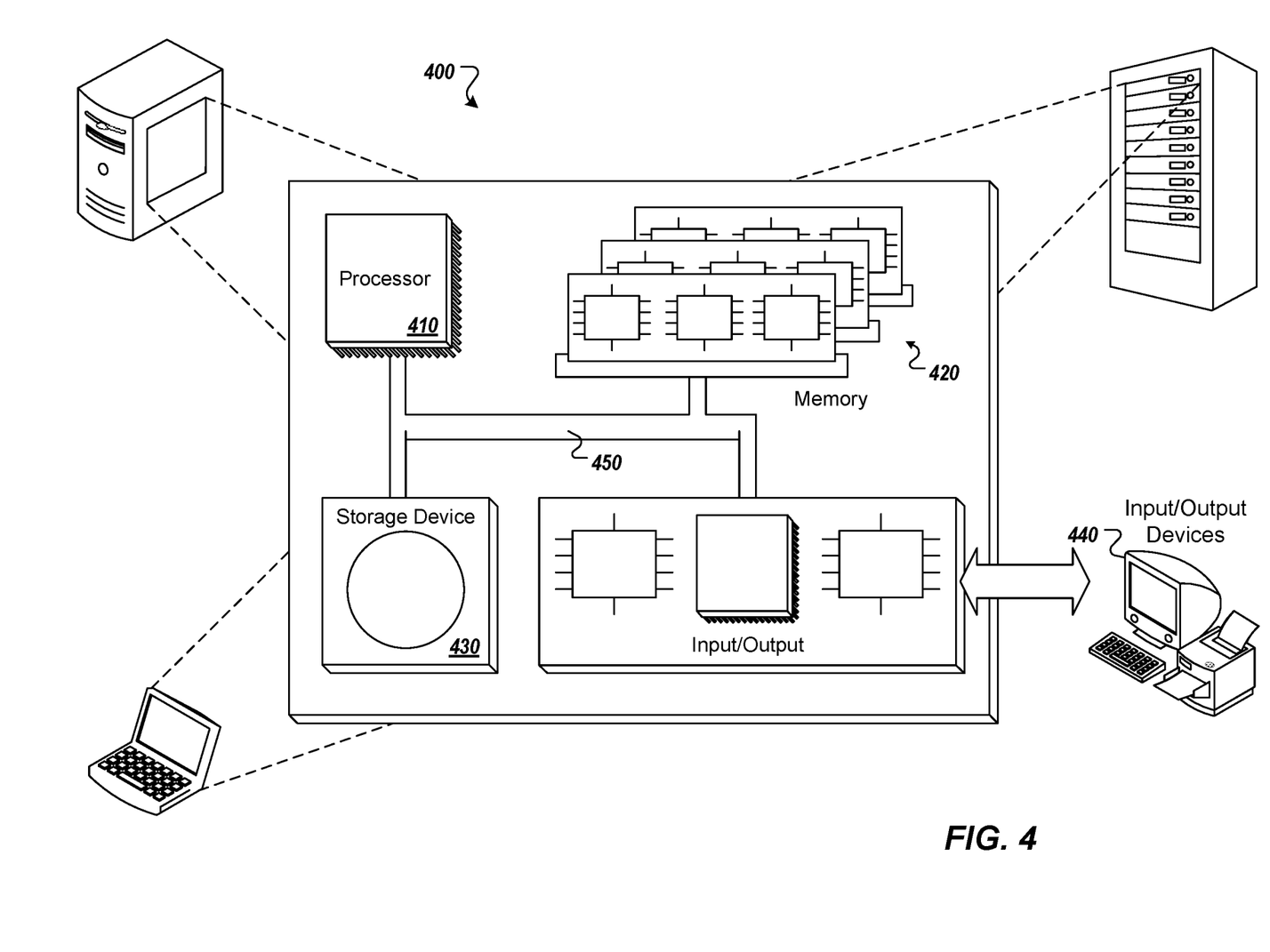
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing machine learning (ML) models for use in a software system provided by a software vendor, the method being executed by one or more processors and comprising:
   providing, by the software vendor, a software system to each customer in a set of customers, each customer being associated with a customer system in a set of customer systems, the software system comprising a set of views in a data science pool of a customer-specific database, the data science pool defining production data that can be accessed through each view in the set of views to provide a data set based on the production data of a respective customer;
   for each customer system:
      accessing, by the software vendor, at least one data set within the customer system through a released view, the at least one data set comprising transformed data of the production data, the released view enabling access to the at least one data set within the data science pool through a view in the set of views, the released view being provided in a demilitarized zone (DMZ) within the customer system, and
      triggering, by the software vendor, training of a ML model in the DMZ within the customer system to provide a trained ML model and results; and
   selectively publishing the trained ML model for consumption by each of the customers in the set of customers based on a set of results comprising the results from each customer system.

2. The method of claim 1, wherein, in response to triggering of training of the ML model, training of the ML model is performed based on a workload schedule defined by a respective customer.

3. The method of claim 1, wherein the released view is released to the DMZ from the set of views by a respective customer.

4. The method of claim 1, wherein each view in the set of views applies one or more transformations to the production data of the respective customer.

5. The method of claim 4, wherein the one or more transformations comprise one or more of transforming text data to numerical data, and modifying numerical data based on one or more random numbers.

6. The method of claim 1, wherein selectively publishing the ML model for consumption comprises determining that the ML model is satisfactory based on the set of results, and in response, publishing the ML model.

7. The method of claim 1, wherein the set of results comprises accuracies of the ML model, each accuracy corresponding to a respective customer in the set of customer.

8. A non-transitory computer-readable storage medium coupled to one or more processors and having instructions stored thereon which, when executed by the one or more processors, cause the one or more processors to perform operations for providing machine learning (ML) models for use in a software system provided by a software vendor, the operations comprising:
   providing, by the software vendor, a software system to each customer in a set of customers, each customer being associated with a customer system in a set of customer systems, the software system comprising a set of views in a data science pool of a customer-specific database, the data science pool defining production data that can be accessed through each view in the set of views to provide a data set based on the production data of a respective customer;
   for each customer system:
      accessing, by the software vendor, at least one data set within the customer system through a released view, the at least one data set comprising transformed data of the production data, the released view enabling access to the at least one data set within the data science pool through a view in the set of views, the released view being provided in a demilitarized zone (DMZ) within the customer system, and
      triggering, by the software vendor, training of a ML model in the DMZ within the customer system to provide a trained ML model and results; and
   selectively publishing the trained ML model for consumption by each of the customers in the set of customers based on a set of results comprising the results from each customer system.

9. The computer-readable storage medium of claim 8, wherein, in response to triggering of training of the ML model, training of the ML model is performed based on a workload schedule defined by a respective customer.

10. The computer-readable storage medium of claim 8, wherein the released view is released to the DMZ from the set of views by a respective customer.

11. The computer-readable storage medium of claim 8, wherein each view in the set of views applies one or more transformations to the production data of the respective customer.

12. The computer-readable storage medium of claim 11, wherein the one or more transformations comprise one or more of transforming text data to numerical data, and modifying numerical data based on one or more random numbers.

13. The computer-readable storage medium of claim 8, wherein selectively publishing the ML model for consumption comprises determining that the ML model is satisfactory based on the set of results, and in response, publishing the ML model.

14. The computer-readable storage medium of claim 8, wherein the set of results comprises accuracies of the ML model, each accuracy corresponding to a respective customer in the set of customer.

15. A system, comprising:
   a computing device; and
   a computer-readable storage device coupled to the computing device and having instructions stored thereon which, when executed by the computing device, cause the computing device to perform operations for providing machine learning (ML) models for use in a software system provided by a software vendor, the operations comprising:
      providing, by the software vendor, a software system to each customer in a set of customers, each customer being associated with a customer system in a set of customer systems, the software system comprising a set of views in a data science pool of a customer-specific database, the data science pool defining production data that can be accessed through each view in the set of views to provide a data set based on the production data of a respective customer;

for each customer system:
  accessing, by the software vendor, at least one data set within the customer system through a released view, the at least one data set comprising transformed data of the production data, the released view enabling access to the at least one data set within the data science pool through a view in the set of views, the released view being provided in a demilitarized zone (DMZ) within the customer system, and
  triggering, by the software vendor, training of a ML model in the DMZ within the customer system to provide a trained ML model and results; and selectively publishing the trained ML model for consumption by each of the customers in the set of customers based on a set of results comprising the results from each customer system.

16. The system of claim 15, wherein, in response to triggering of training of the ML model, training of the ML model is performed based on a workload schedule defined by a respective customer.

17. The system of claim 15, wherein the released view is released to the DMZ from the set of views by a respective customer.

18. The system of claim 15, wherein each view in the set of views applies one or more transformations to the production data of the respective customer.

19. The system of claim 18, wherein the one or more transformations comprise one or more of transforming text data to numerical data, and modifying numerical data based on one or more random numbers.

20. The system of claim 15, wherein selectively publishing the ML model for consumption comprises determining that the ML model is satisfactory based on the set of results, and in response, publishing the ML model.

* * * * *